US006767984B2

(12) United States Patent
Toui et al.

(10) Patent No.: US 6,767,984 B2
(45) Date of Patent: Jul. 27, 2004

(54) TOP COATING COMPOSITION

(75) Inventors: Teruzo Toui, Kitakatsuragi-gun (JP); Hisaki Tanabe, Yawata (JP); Nobuhisa Sudo, Hiroshima (JP); Satoshi Urano, Kyotanabe (JP); Manabu Yoshioka, Kariya (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/851,983

(22) Filed: May 10, 2001

(65) Prior Publication Data
US 2002/0010271 A1 Jan. 24, 2002

(30) Foreign Application Priority Data

May 9, 2000 (JP) ........................................ 2000-135548

(51) Int. Cl.[7] ............................................. C08G 77/442

(52) U.S. Cl. ...................... 528/35; 106/287.16; 528/39; 525/474

(58) Field of Search ....................... 506/287.13, 287.16; 525/474, 100; 528/26, 39, 35; 428/447; 106/287.13

(56) References Cited

U.S. PATENT DOCUMENTS

| 5,635,572 A | | 6/1997 | Ohnishi et al. | |
|---|---|---|---|---|
| 5,855,960 A | | 1/1999 | Ohnishi et al. | |
| 6,013,724 A | * | 1/2000 | Mizutani et al. | 106/15.05 |
| 6,271,293 B1 | * | 8/2001 | Karuga et al. | 524/243 |
| 6,383,648 B1 | * | 5/2002 | Tamai et al. | 428/446 |

FOREIGN PATENT DOCUMENTS

| JP | 60199074 A | * | 10/1985 | ............ C09D/3/82 |
|---|---|---|---|---|
| JP | 61 221282 | | 10/1986 | |
| JP | 2000144049 A | * | 5/2000 | ......... C09D/175/04 |
| WO | WO 9822547 | * | 8/1998 | |
| WO | WO 9846691 | * | 10/1998 | |

* cited by examiner

Primary Examiner—Margaret G. Moore
Assistant Examiner—Marc Zimmer
(74) Attorney, Agent, or Firm—Sughrue Mion, PLLC

(57) ABSTRACT

This invention provides a top coating composition which comprises
 a coating film-forming resin (I); as well as
 a silicate compound (II) besides a hydrolyzable silyl-containing resin (III)
and/or a silicate-grafted resin (IV) resulting from graft polymerization of a silicate compound (II) onto a hydrolyzable silyl-containing resin (III).

7 Claims, No Drawings

TOP COATING COMPOSITION

FIELD OF THE INVENTION

The present invention relates to a coating composition, in particular a coating composition suited for use as a coating composition for automotive top coating.

PRIOR ART

Superhydrophobic fluororesin-containing coatings are known in the art as coatings excellent in stain resistance and suited for architectural, civil engineering or automotive use, among others. It has so far been considered that such superhydrophobic fluororesin-containing coatings hardly allow water to remain adhering to the surface thereof, hence stains can hardly be left on that surface.

In actuality, however, outdoor exposure of those coatings causes problems: the dirt in the atmosphere easily adheres to their surface and traces of rain water are readily left and deposited thereon. Therefore, for forming stain-resistant coating films with the surface thereof rendered hydrophilic, the international laid-open patent specification WO 94/06870 proposes a coating film forming method which comprises incorporating an organosilicate, such as methyl silicate or ethyl silicate, in a top coating and, after application of the resulting top coating, treating the coating film surface with an acid to thereby render the angle of contact with water not more than 70°.

However, even such coating compositions cannot provide sufficient stain resistance. When the silicate addition amount is increased for increasing the stain-resisting effect, the problems mentioned below may arise depending on the environmental conditions in the step of application. For example, under high humidity conditions, for example at a humidity of 80% or higher, in the step of setting or baking, appearance abnormalities, such as coating film cracks, may occur. Conversely, under low humidity conditions, for example at a humidity of 60% or below, the resulting coating films obtained may be turbid or show whitening after water resistance testing.

In view of the above-mentioned state of the art, it is an object of the present invention to provide a top coating composition which can provide coatings showing a good appearance irrespective of humidity conditions in the step of application and can provide them with good weathering resistance and stain resistance.

SUMMARY OF THE INVENTION

The present invention provides a top coating composition which comprises a coating film-forming resin (I);

as well as a silicate compound (II) besides a hydrolyzable silyl-containing resin (III)

and/or a silicate-grafted resin (IV) resulting from graft polymerization of a silicate compound (II) onto a hydrolyzable silyl-containing resin (III).

The invention also provides a top coating composition as defined above wherein said silicate compound (II) is a modified silicate compound represented by the general formula (1):

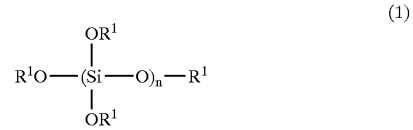

in the formula, n represents an integer of 1 to 30; at least one of the $R^1$ groups is an organic group represented by $R^2-(O-CH_2-CHR^3)_m-$, where $R^2$ is an alkyl group containing 1 to 8 carbon atoms, a phenyl group or a benzyl group, $R^3$ is a hydrogen atom or a methyl group and m is an integer of 1 to 4, and the remaining $R^1$ groups each is a methyl or ethyl group.

The invention further provides a top coating composition as defined above wherein said hydrolyzable silyl-containing resin (III) is an acrylic resin obtainable by radical polymerization of a silanol- and/or hydrolyzable silyl-containing, radical-polymerizable monomer (III-a), a hydroxyl-containing, radical-polymerizable monomer (III-b) and another radical-polymerizable monomer (III-c).

The invention still further provides a top coating composition as defined above wherein said coating film-forming resin (I) comprises a hydroxyl-containing resin and a polyisocyanate compound.

DETAILED DESCRIPTION OF THE INVENTION

The top coating composition according to the invention comprises a coating film-forming resin (I);

as well as a silicate compound (II) besides a hydrolyzable silyl-containing resin (III)

and/or a silicate-grafted resin (IV) resulting from graft polymerization of a silicate compound (II) onto a hydrolyzable silyl-containing resin (III).

The above coating film-forming resin component (I) includes those soluble in an organic solvent and of the reactive curable type. Such coating film-forming resin component preferably comprises a hydroxyl-containing resin and a curing agent.

The hydroxyl-containing resin is not particularly restricted but includes, among others, such coating film-forming resins as acrylic resins, polyester resins, alkyd resins, epoxy resins and urethane resins. Among them, hydroxyl-containing acrylic resins are preferred from the coating film performance and weathering resistance viewpoint.

The hydroxyl-containing acrylic resins can be obtained by subjecting a hydroxyl-containing radical-polymerizable monomer and another or other radical-polymerizable monomers to radical polymerization. The hydroxyl-containing radical-polymerizable monomer is not particularly restricted but includes, among others, 2-hydroxyethyl (meth)acrylate, 4-hydroxybutyl (meth)acrylate, hydroxypropyl (meth)acrylate and Placcel FM-1 (trademark; product of Daicel Chemical Industries) These may be used singly or two or more of them may be used combinedly.

The other radical-polymerizable monomers are not particularly restricted but include, among others, styrenic monomers such as styrene and α-methylstyrene; (meth)acrylate esters such as methyl (meth)acrylate, ethyl (meth)acrylate, propyl (meth)acrylate, n-, iso- or tert-butyl (meth)

acrylate, 2-ethylhexyl (meth)acrylate, lauryl (meth)acrylate and glycidyl (meth)acrylate; and amides such as acrylamide and methacrylamide. These may be used singly or two or more of them may be used combinedly.

The method of copolymerization is not particularly restricted but the copolymerization can be carried out in the manner of solution polymerization such as ordinary radical polymerization. The above resin preferably has a number average molecular weight (Mn) of 1,000 to 100,000, in particular 2,000 to 30,000. When the number average molecular weight (Mn) is less than 1,000, the resulting coating film may possibly show decreased weathering resistance. When it exceeds 100,000, the resin will show an increased viscosity, impairing the workability of the composition in the step of coating and, in addition, a poor coating film appearance will result due to the decreased compatibility with the curing agent and/or silicate compound. The number average molecular weight (Mn) so referred to herein is the number average molecular weight on the polystyrene equivalent basis as determined by GPC (gel permeation chromatography).

The above hydroxyl-containing resin preferably has a hydroxyl value of 10 to 200, more preferably 30 to 170. When the hydroxyl value is below the lower limit, sufficient curability will not be obtained, When the hydroxyl value is above the upper limit, the coating film will show decreased flexibility.

The above hydroxyl-containing resin is used in combination with a curing agent. As such a curing agent, there may be mentioned polyisocyanate compounds. The polyisocyanate compounds include, but are not limited to, 2,4-tolylene diisocyanate, diphenylmethane 4,4'-diisocyanate, xylylene diisocyanate, isophorone diisocyanate, lysine methyl ester diisocyanate, methylcyclohexyl diisocyanate, trimethylhexamethylene diisocyanate, hexamethylene diisocyanate, n-pentane-1,4-diisocyanate, trimers thereof, adducts and biurets derived therefrom, polymers thereof containing two or more isocyanato groups and, further, modifications derived therefrom by reacting some of the isocyanato groups with various alcohols, among others.

The mixing ratio between the polyisocyanate compound and the hydroxyl-containing resin as expressed in terms of NCO/OH (mole ratio) is preferably 0.5 to 1.5, more preferably 0.8 to 1.2. A mixing ratio outside the above range is undesirable since it results in decreases in coating film weathering resistance, water resistance and solvent resistance, for instance.

The amount of the above coating film-forming resin (I) in the top coating composition of the invention is preferably 10 to 98% by weight, in particular 10 to 70% by weight, based on the total resin component basis. When the amount of the coating film-forming resin (I) is less than 10% by weight, the coating film weathering resistance, water resistance and solvent resistance will decrease. When it exceeds 98% by weight, the stain resistance will be insufficient. The above-mentioned weight percent values are calculated on the solid basis.

As specific examples of the above silicate compound (II), there may be mentioned tetraniethoxysilane, tetraethoxysilane, tetra-n-propoxysilane, tetra-i-propoxysilane, tetra-n-butoxysilane, tetra-1-butoxysiiane, tetra-t-butoxysilane, tetra-n-pentoxysi lane, tetra-i-pentoxysilane, tetraneopentoxysilane and the like; and condensation products derived from one or more of them, among others.

The silicate compound (II) to be contained in the top coating composition of the invention is preferably a modified silicate compound represented by the general formula (1):

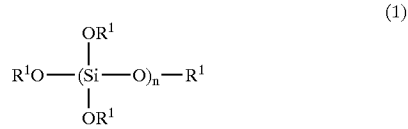

(1)

in the formula, n represents an integer of 1 to 30; at least one of the $R^1$ groups is an organic group represented by $R^2$—(O—$CH_2$—$CHR^3$)$_m$—, where $R^2$ is an alkyl group containing 1 to 8 carbon atoms, a phenyl group or a benzyl group, $R^3$ is a hydrogen atom or a methyl group and m is an integer of 1 to 4, and the remaining $R^1$ groups each is a methyl or ethyl group.

When the above n exceeds 30, the compatibility of the resin may decrease to give turbid coatings, and/or the smoothness of the surface of coatings may become decreased. Furthermore, the silicate-grafted resin (IV) resulting from graft polymerization of that silicate compound onto a hydrolyzable silyl-containing resin (III), which is to be further described later herein, will become turbid, failing to become transparent. The value of n is preferably 2 to 30, more preferably 5 to 20.

Preferred as the above organic group containing 1 to 8 carbon atoms are those containing 1 to 6 carbon atoms from the viewpoint that the silicate compound (II) or the silicate-grafted resin (IV) resulting from graft polymerization of the silicate compound (II) can migrate to the surface of wet coatings, tending to occur in large amounts in the vicinity of the surface of coating films, namely the compatibility with the other resin component(s) can be reduced to a proper extent.

As specific examples of the above silicate compound (II) there may be mentioned tetramethoxysilane, tetraethoxysilane, tetra-n-propoxysilane, tetra-i-propoxysilane, tetra-n-butoxysilane, tetra-i-butoxysilane, tetra-t-butoxysilane, tetra-n-pentoxysilane, tetra-i-pentoxysilane, tetraneopentoxysilane and the like; and condensation products derived from one or more of them, among others.

In that case, the above silicate compound (II) is a modified silicate compound with the part of the methyl or ethyl groups of the methyl silicate and/or condensation product, or the ethyl silicate and/or condensation product being modified by the alcohol exchange reaction.

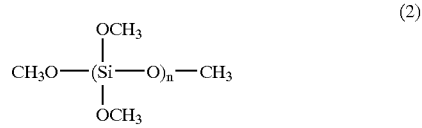

(2)

In the above formula, n is as defined above.

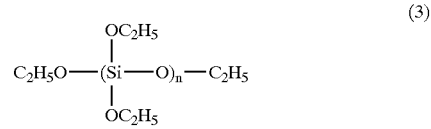

(3)

In the above formula, n is as defined above.

The above methyl silicate and/or condensation product is not particularly restricted but includes, among others, such commercial products as "MKC Silicate MS-51", "MKC Silicate MS-56" and "MKC Silicate MS-60" (all trademarks; products of Mitsubishi Chemical Corp.) and the like.

The above ethyl silicate and/or condensation product is not particularly restricted but includes, among others, such commercial products as "Ethyl Silicate 40", "Ethyl Silicate 48" and "Ethyl Silicate 28" (all trademarks; products of Colcoat Co., Ltd.) and the like.

The above alcohol exchange reaction is carried out by using the above methyl silicate and/or condensation product or the above ethyl silicate and/or condensation product as a reaction substrate and an alcohol compound as a reagent.

As the above alcohol, there may be mentioned ether alcohol compounds such as methylcellosolve, ethylcellosolve, butylcellosolve, hexylcellosolve, butyl diglycol, propylene glycol monomethyl ether, propylene glycol monoethyl ether, propylene glycol monopropyl ether, propylene glycol monobutyl ether and the like. These may be used singly or two or more of them may be used combinedly.

In carrying out the above alcohol exchange reaction, an alcohol exchange catalyst may be used. The alcohol exchange catalyst is not particularly restricted but may be an acid or a base. The acid is not particularly restricted but includes, among others, Brønsted acids such as hydrochloric acid, sulfuric acid, phosphoric acid and sulfonic acids; and Lewis acids such as organotin compounds. The above base is not particularly restricted but includes, among others, tertiary amines such as triethylamine, diisopropylethylamine, dimethylbenzylamine, diazabicyclo[2.2.2]octane and 1,8-diazabicyclo[5.4.0]undecene-7. These may be used singly or two or more of them may be used combinedly.

In carrying out the above alcohol exchange reaction, it is not necessary to use a particular solvent. However, the alcohol compound, which is the reagent, may be used as the solvent, namely in excess relative to the reaction substrate.

The above solvent is not particularly restricted but includes, among others, aromatic hydrocarbons such as toluene, benzene and xylene; halogenated hydrocarbons such as dichloroethane; ethers such as THF and dioxane; ketones such as methyl ethyl ketone and methyl isobutyl ketone; esters such as ethyl acetate and butyl acetate; dimethyl carbonate, acetonitrile, and the like. These may be used singly or two or more of them may be used combinedly.

The amount of the above solvent is not particularly restricted but is preferably not less than 10 times the total weight of the reaction substrate methyl silicate and/or a condensation product thereof, or ethyl silicate and/or a condensation product thereof, and the alcohol compound reagent.

The ratio of the reagent alcohol compound to the reaction substrate methyl silicate and/or a condensation product thereof, or ethyl silicate and/or a condensation product thereof, in the above alcohol exchange reaction is not particularly restricted but the alcohol compound may for example be used in a proportion of at least 1 mole % and not less than the amount required for the modification.

The above alcohol exchange reaction may be carried out while azeotropically distilling off the methanol or ethanol resulting from the modification.

The reaction conditions of the above alcohol exchange reaction are not particularly restricted. The reaction temperature is generally 0° C. to 200° C., however. The reaction time is preferably not longer than 24 hours, for instance. The reaction is generally carried out at ordinary pressure but, if necessary, it may be carried out under reduced pressure so that the byproduct methanol may be distilled off.

The reaction rate in the above alcohol exchange reaction can be checked by determining the amount of the byproduct methanol, by NMR spectrometry or by GC (gas chromatography), for instance. The thus-obtained product generally occurs as a colorless to light-yellow oily compound.

The hydrolyzable silyl-containing resin (III) to be contained in the top coating composition of the invention is an acrylic copolymer obtainable by radical polymerization of a silanol- and/or hydrolyzable silyl-containing, radical-polymerizable monomer (III-a), a hydroxyl-containing, radical-polymerizable monomer (III-b) and another radical-polymerizable monomer (III-c).

The above hydrolyzable silyl-containing resin (III) can be prepared by radical-polymerizing a monomer component comprising 5 to 50% by weight of a silanol- and/or hydrolyzable silyl-containing, radical-polymerizable monomer (III-a), 3 to 50% by weight of a hydroxyl-containing, radical-polymerizable monomer (III-b) and 20 to 50% by weight of another radical-polymerizable monomer (III-c).

When the amount of the silanol- and/or hydrolyzable silyl-containing, radical-polymerizable monomer (III-a) is less than the lower limit, coating film cracking may occur under high humidity conditions. When it exceeds the upper limit, coating film flexibility will decrease. A preferred range is 10 to 30% by weight.

When the amount of the above hydroxyl-containing, radical-polymerizable monomer (III-b) is smaller than the lower limit, the coating film hardness and solvent resistance may lower and, when it is above the upper limit, the coating film flexibility will decrease. That monomer is preferably used in an amount of 10 to 40% by weight. It preferably has a hydroxyl value of 10 to 200, more preferably 30 to 170. When the hydroxyl value is less than the lower limit, sufficient curability is hardly obtained and, further, the grafting reaction with the silicate compound will hardly proceed and the silicate-grafted resin will become turbid. When the hydroxyl value exceeds the upper limit, the coating film flexibility will decrease.

The silanol- and/or hydrolyzable silyl-containing, radical-polymerizable monomer (III-a) is represented by the general formula (4):

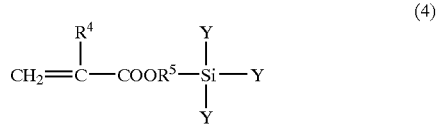

(4)

In the above formula, $R^4$ represents a hydrogen atom or a methyl group, $R^5$ represents a hydrocarbon group containing 1 to 6 carbon atoms, the three Y's may be the same or different and each represents a hydroxyl group, an alkoxy group containing 1 to 4 carbon atoms or an aliphatic hydrocarbon group containing 1 to 8 carbon atoms. As the hydrocarbon group containing 1 to 6 carbon atoms as represented by $R^5$, there may be mentioned straight or branched bivalent alkylene, alkenylene and arylene groups, among others. The aliphatic hydrocarbon group represented by Y may be an alkyl, aryl or aralkyl group, and this alkyl or aralkyl and the above alkoxy may be straight or branched.

As specific examples of the silane group-containing monomer represented by the above general formula (4), there may be mentioned, among others, γ-(meth)acryloxypropyltrimethoxysilane,
γ-(meth)acryloxypropyltriethoxysilane, γ-(meth)acryloxypropyltripropoxysilane,
γ-(meth)acryloxypropylmethyldimethoxysilane,
γ-(meth)acryloxypropylmethyldiethoxysilane,
γ-(meth)acryloxypropylmethyldipropoxysilane,
γ-(meth)acryloxybutylphenyldimethoxysilane,
γ-(meth)acryloxybutylphenyldiethoxysilane,
γ-(meth)acryloxybutylphenyldipropoxysilane,
γ-(meth)acryloxypropyldimethylmethoxysilane,
γ-(meth)acryloxypropyldimethylethoxysilane,
γ-(meth)acryloxypropylphenylmethylmethoxysilane,
γ-(meth)acryloxypropylphenylmethylethoxysilane,
γ-(meth)acryloxypropyltrisilanol,
γ-(meth)acryloxypropylmethyldihydroxysilane,
γ-(meth)acryloxybutylphenyldihydroxysilane,
γ-(meth)acryloxypropyldimethylhydroxysilane and
γ-(meth)acryloxypropylphenylmethylhydroxysilane.

The above hydroxyl-containing, radical-polymerizable monomer (III-b) and the other radical-polymerizable monomer (III-c) each is not particularly restricted but includes, among others, those mentioned hereinabove referring to the acrylic resin. These may be used singly or two or more of them may be used combinedly.

The above hydrolyzable silyl-containing resin (III) can be obtained by copolymerizing the radical-polymerizable monomer component mentioned above using a radical polymerization initiator. The method of effecting the above copolymerization is not particularly restricted but the copolymerization can be carried out in the conventional manner of radical polymerization, for example in the manner of solution polymerization. For example, the copolymerization can be conducted at a temperature of 100 to 140° C. over a period of 3 to 8 hours.

The above radical polymerization initiator is not particularly restricted but includes, among others, tert-butyl peroxy-2-ethylhexanoate and dimethyl 2,2'-azobisisobutyrate. These may be used singly or two or more of them may be used in combination. The above radical polymerization initiator is used preferably in an amount of 3 to 15% by weight relative to the total amount of the monomers mentioned above. In the above copolymerization, a chain transfer agent and the like may be added as an additive.

The above hydrolyzable silyl-containing resin (III) has a number average molecular weight (Mn) of 1,000 to 8,000 and has 1 to 10 hydrolyzable silyl groups and 2 to 12 hydroxyl groups per molecule. Its hydroxyl value is 5 to 200 mg KOH/g. When the number average molecular weight (Mn) of the hydrolyzable silyl-containing resin (III) is less than 1,000, the water resistance of the coating films becomes low. When it is above 8,000, the coating film appearance (surface smoothness) is impaired and, when the number of hydrolyzable silyl groups is less than 1 per molecule, the grafting reaction with the silicate compound (II) will not proceed sufficiently but the graft copolymer remains in a turbid state, hence polished portions of the coatings obtained will show decreased stain resistance. When that number is in excess of 10, the cured coatings obtained may become excessively hard and this may lead to decreased weathering resistance. When the hydroxyl value is less than 5 mg KOH/g, poor adhesiveness will result and, when it is above 200 mg KOH/g, the cured coating films will have insufficient water resistance.

More preferably, the resin has 2 to 10 epoxy groups per molecule and an epoxy equivalent of 100 to 800. An epoxy equivalent less than 100 will lead to excessively hard cured coating films, hence lowered weathering resistance. An epoxy equivalent exceeding 800 will lead to insufficient coating curability. Most preferably, the resin has 4 to 10 hydroxyl groups and 3 to 8 epoxy groups per molecule and has a hydroxyl value of 10 to 150 mg KOH/g and an epoxy equivalent of 200 to 600. The hydroxyl value and epoxy equivalent values are calculated on the solid basis.

The above epoxy groups can be introduced into the resin by carrying out the copolymerization using an epoxy-containing monomer, such as glycidyl (meth)acrylate and 3,4-epoxycyclohexanylmethyl methacrylate, as a component of the other radical-polymerizable monomer(s) (III-c).

The above hydrolyzable silyl-containing resin (III) is used in an amount of 1 to 50% by weight, preferably 5 to 30% by weight, based on the resin solids in the top coating composition of the invention. At an amount below 1% by weight, coating film cracking tends to occur under high humidity conditions or coating films will become turbid under low humidity conditions or whiten after water resistance testing. At above 50% by weight, the coating film flexibility will decrease.

The silicate-grafted resin (IV) to be contained in the top coating composition of the invention results from grafting the silicate compound (II) onto the hydrolyzable silyl-containing resin (III). The silicate compound (II) may comprise a single species or a combination of two or more species. It may be the same as or different from the silicate compound (II) intended to be used as it is.

In accordance with the invention, the silicate-grafted resin (IV) may be used in lieu of the above-mentioned silicate compound (II) and hydrolyzable silyl-containing resin (III) or these (II), (III) and (IV) may be used combinedly.

The method of effecting the above grafting reaction is not particularly restricted but may be any of the conventional ones. It may be carried out in the absence or presence of an organic solvent. The organic solvent is not particularly restricted but includes, among others, esters such as ethyl acetate and butyl acetate; ketones such as acetone and methyl ethyl ketone; ethers such as tetrahydrofuran and dioxane; and aromatic hydrocarbons such as toluene, xylene and Solvesso 100 (aromatic hydrocarbon solvent, product of Esso).

The reaction temperature and reaction time in the above grafting reaction may vary depending on the raw material species. Generally, however, the temperature is preferably within the range of from room temperature to 150° C. and the time is preferably not longer than 24 hours. When the reaction is carried out at below room temperature, the grafting of the silicate compound (II) will not proceed to a sufficient extent and a temperature above 150° C. or a time longer than 24 hours will cause mutual condensation of the silicate compound (II).

The degree of grafting of the above silicate compound (II) is such that the amount of the above silicate compound (II) grafted amounts to 0.5 to 50% by weight relative to the sum total of the resin components mentioned above. When the amount of the silicate compound (II) is less than 0.5% by weight, the resulting coating films will acquire only insufficient hydrophilicity and show low stain resistance. When it exceeds 50% by weight, the coating film flexibility will decrease and the storage stability of the silicate-grafted resin (IV) may reduce.

The silicate-grafted resin (IV) is used in the top coating composition of the invention preferably in an amount of 2 to 90% by weight, in particular 40 to 90% by weight, on the whole resin component basis. When the silicate-grafted resin (IV) mentioned above is used in an amount less than 2% by weight, coating film cracking will occur under high humidity conditions and, under low humidity conditions, the resulting coating films may become turbid or whiten after water resistance testing. At an amount exceeding 90% by weight, the coating film flexibility will decrease. The above-mentioned percent by weight values are calculated on the solid basis.

In the above top coating composition, there may be incorporated a melamine-formaldehyde resin for increasing the crosslink density and improve the water resistance, an ultraviolet absorber, light stabilizer or like additive for improving the weathering resistance of coating films, a microgel for rheology control, a surface modifier, a diluent for viscosity adjustment, and so forth.

The above ultraviolet absorber or light stabilizer is not particularly restricted but includes, among others, Tinuvin 900 (product of Ciba Specialty Chemicals K.K.) and Sanol LS-292 (product of Sankyo Company, Ltd.). The above diluent is not particularly restricted but includes, among others, hydrocarbons, esters and like solvents. These may be used singly or two or more of them may be used combinedly.

The above-mentioned top coating composition for automobiles may contain a color pigment. The color pigment is not particularly restricted but includes, among others, iron oxide, lead oxide, carbon black, coal dust, titanium dioxide, talc, barium sulfate, cadmium yellow, cadmium red, chrome yellow, metal pigments (e.g. alumina flakes, aluminum flakes, etc.), organic pigments (e.g. phthalocyanine blue, Cinquacia red, etc.), pearl mice and the like. These may be used singly or two or more of them may be used combinedly.

The above top coating composition has a solid content of 25 to 70% by weight, preferably 35 to 65% by weight. The solid content in the step of application is 15 to 65% by weight, preferably 30 to 60% by weight.

The method of preparing the above top coating composition is not particularly restricted but the composition may be prepared by stirring the ingredients mentioned above using a stirrer or the like. When the composition contains the above pigment, the preparation can also be carried out by kneading using a kneader, a roll or the like. The silicate compound (II) or the resin (IV) resulting from graft polymerization of the silicate compound (II) may be added to and mixed in the coating before application or may be added to and mixed in the coating composition beforehand in the process of producing the coating. When it is added to and mixed in the coating beforehand, the resulting coating is preferably stored under conditions preventing water from entering the same so that hydrolysis or a condensation reaction cannot proceed.

The above top coating composition may be cured even at room temperature. In that case, the composition is preferably maintained in a condition allowing no curing at room temperature prior to application. Specifically, when the coating film-forming resin (I) component comprises a hydroxyl-containing resin and a polyisocyanate compound, the hydroxyl-containing resin and the polyisocyanate compound are preferably stored in a state separated from each other.

In the above case, a urethane formation-promoting catalyst such as an organotin compound is preferably caused to coexist on the hydroxyl-containing resin side, and the silicate compound (II) mixed in on the polyisocyanate compound side. Further, when the silicate-grafted resin (IV) is used, this is preferably stored in a separated state.

The coating composition of the present invention, after mixing up the respective components, is applied to a substrate to form a coating film thereon. Considering that the coating film obtained in accordance with the present invention is excellent in finished appearance and stain resistance, the composition is preferably used for automotive top coating. In particular, the composition is suited for use as an automotive repair coating or a coating for plastics.

The above top coating composition can be applied by spray coating, brush coating, dipping, electrostatic coating, roll coating, flow-coating and other techniques. In particular, spray coating is preferred. The composition can be applied to a film thickness of about 5 to 200 $\mu$m.

The top coating composition of the invention, which is constituted as mentioned above, gives cured coating films superior in appearance, weathering resistance and stain resistance regardless of the humidity environment in which it is applied. Moreover, because the coatings are highly hydrophilic not only in unpolished portions but also in polished portions, it retains its aesthetic quality and high water resistance without washing a car.

EXAMPLES

The following examples illustrate the present invention in more detail. They are, however, by no means limitative of the scope of the invention.

Production Example

Silicate Compound A

To 595.2 g (0.8 mole) of Ethyl Silicate 40 (product of Colcoat; average molecular weight 745, 12 ethoxy groups per molecule) were added 284.5 g (2.4 moles) of butylcellosolve and 6.6 g of acetic acid, and the reaction was carried out at 90° C. for 1 hour, at 120° C. for 2 hours and then at 140° C. for 2 hours while removing the byproduct ethanol. After cooling, the acetic acid was removed by concentration under reduced pressure to give 641.8 g of a butylcellosolve-substituted ethyl silicate condensate.

Silicate Compound B

To 630.0 g (0.6 mole) of MKC Silicate MS-56 (product of Mitsubishi Chemical; average molecular weight 1,500, 22 methoxy groups per molecule) was added 283.2 g (2.4 moles) of butylcellosolve, and the reaction was carried out at 120° C. for 3 hours while removing the byproduct methanol. After cooling, 704.4 g of a butylcellosolve-substituted methyl silicate condensate was obtained.

Silicate Compound C

To 735.0 g (0.7 mole) of MKC Silicate MS-56 (product of Mitsubishi Chemical; average molecular weight 1,500, 22 methoxy groups per molecule) were added 161.0 g (3.5 moles) of ethanol and 2.02 g (0.62 mole) of triethylamine, and the reaction was carried out under reflux at 75° C. for 5 hours, then the temperature was raised to 120° C. and the methanol and triethylamine were distilled off over 2 hours. After cooling, 746.0 g of an ethyl-substituted methyl silicate condensate was obtained.

Hydrolyzable Silyl-containing Resin D

A one-liter reaction vessel equipped with a thermometer, stirrer, condenser, nitrogen inlet tube and dropping funnel was charged with 260 weight parts of Solvesso 100 and 25 weight parts of propylene glycol monomethyl ether acetate, and the temperature was raised to 125° C. To this reaction vessel was added dropwise over 3 hours through the dropping funnel a solution composed of 100 weight parts of n-butyl methacrylate, 100 weight parts of styrene, 122 weight parts of isobutyl methacrylate, 50 weight parts of γ-methacryloxypropyltrimethoxysilane, 128 weight parts of 4-hydroxybutyl acrylate, 55 weight parts of tert-butyl peroxy-2-ethylhexanoate and 55 weight parts of Solvesso 100. After dripping, the mixture was maintained at 125° C. for 30 minutes and then a solution composed of 5 weight parts of tert-butyl peroxy-2-ethylhexanoate and 10 weight parts of xylene was added dropwise over 30 minutes. After this dripping, the reaction was allowed to proceed further at 125° C. for 1 hour to give a varnish containing a hydrolyzable silyl-containing resin (resin D) with a number average molecular weight of 3,000 and a hydroxyl value of 100 mg KOH/g (on the solid basis) and having a nonvolatile matter content of 59%.

Hydrolyzable Silyl-containing Resin E

A one-liter reaction vessel equipped with a thermometer, stirrer, condenser, nitrogen inlet tube and dropping funnel was charged with 125 weight parts of xylene and 160 weight parts of butyl acetate, and the temperature was raised to 125° C. To this reaction vessel was added dropwise over 3 hours through the dropping funnel a solution composed of 190 weight parts of glycidyl methacrylate, 100 weight parts of styrene, 146 weight parts of γ-methacryloxypropyltriethoxysilane, 64 weight parts of 4-hydroxybutyl acrylate, 55 weight parts of tert-butyl peroxy-2-ethylhexanoate and 55 weight parts of butyl acetate. After dripping, the mixture was maintained at 125° C. for 30 minutes and then a solution composed of 5 weight parts of tert-butyl peroxy-2-ethylhexanoate and 10 weight parts of xylene was added dropwise over 30 minutes. After this dripping, the reaction was allowed to proceed further at 125° C. for 1 hour to give a varnish containing a hydrolyzable silyl-containing resin E with a number average molecular weight of 3,560, an epoxy equivalent of 150 (on the solid basis) and a hydroxyl value of 50 mg KOH/g (on the solid basis) and having a nonvolatile matter content of 59%.

Silicate-grafted Resin F

A one-liter reaction vessel equipped with a thermometer, stirrer, condenser and nitrogen inlet tube was purged with nitrogen gas and then charged with 60 weight parts of the butylcellosolve-substituted methyl silicate B, 400 weight parts of the hydrolyzable silyl-containing resin D and 5 weight parts of trimethyl orthoacetate, and the grafting reaction was carried out at 110° C. for 3 hours to give a varnish having a nonvolatile matter content of 64% and containing a silicate-grafted resin F resulting from graft polymerization of the silicate compound.

Silicate-grafted Resin G

A one-liter reaction vessel equipped with a thermometer, stirrer, condenser and nitrogen inlet tube was purged with nitrogen gas and then charged with 98 weight parts of the butylcellosolve-substituted methyl silicate B, 297 weight parts of the hydrolyzable silyl-containing resin E, 57 weight parts of butyl acetate and 4 weight parts of trimethyl orthoacetate, and the grafting reaction was carried out at 110° C. for 4 hours to give a varnish having a nonvolatile matter content of 60% and containing a silicate-grafted resin G resulting from graft polymerization of the silicate compound.

Example 1

A clear coating was prepared by incorporating, in the resin component specified in Table 1 (the amount being given on the solid basis), 10 weight parts of the silicate compound A, 5 weight parts of the hydrolyzable silyl-containing resin D, 49 weight parts of a hydroxyl-containing acrylic resin, 46 weight parts of Mitec NY 215A (IPDI-based polyisocyanate, product of Mitsubishi Chemical), 2 weight parts of Tinuvin 900 (ultraviolet absorber, product of Ciba Specialty Chemicals), 1 weight part of Sanol LS-440 (light stabilizer, product of Sankyo) and 0.1 weight part of Modaflow (surface modifier, product of Monsanto) with stirring using a disperser. The clear coating obtained was then diluted with Nippe 500 Standard Thinner (product of Nippon Paint) to a viscosity of 23 seconds (Ford cup No. 4, 20° C.).

A Nippon Paint cationic electrodeposition coating, PowerTop V-20 (trademark), and a polyester-melamine type gray intermediate coating, Orga TO H-870 (trademark), were applied to phosphated steel sheets to dry film thicknesses of 20 μm and 30 μm, respectively and then cured by heating. The coatings were polished with a #2400 sandpaper and cleaned by wiping using petroleum benzine. The thus-prepared coated steel sheets were used as test substrates.

Then, the above diluted clear coating was applied to the substrates to a dry film thickness of 30 μm by spraying at a temperature of 20° C. and a humidity of 70%, followed by 40 minutes of baking and drying at 60° C. to give clear coating films.

Further, the clear coating was applied in the same manner as mentioned except that the humidity was 90% or 50%. The coating films obtained were evaluated for appearance and typical performance characteristics. The results are shown in Table 1.

Evaluation Methods (1) Appearance Evaluation

The coating obtained were evaluated by observation by the eye. The evaluation criteria were as follows:

○: Good smoothness and no turbidity;
Turbid: The coating is turbid;
Crack: Cracking is observed on the surface.

(2) Water Resistance Test

The cured coating films obtained were immersed in warm water (40° C.) for 10 days and the surface thereof was evaluated by the eye according to the following criteria:

○: No change;
Δ: Slight whitening was seen;
×: Abnormality such as blistering and whitening was observed.

(3) Measurement of Coatings for Angle of Contact with Water

A drop of water was dropped onto the sample and, after 30 seconds, the static contact angle was measured, as a physical characteristics of the material surface, using a model CA-Z automatic contact angle meter (product of Kyowa Kaimen Kagaku K.K.). This measurement was repeated 5 times. The highest and lowest values were discarded, and the mean of the remaining three values was calculated. The smaller the mean value is, the higher the hydrophilicity is and the better the stain resistance is.

(4) Stain Resistance

Test sample sheets (prepared by applying the clear coating of the invention onto a white top coating film, followed by baking) were set in position for outdoor exposure at an angle of 30 degrees toward the south at the Nippon Paint Neyagawa plant. After 1 month or 6 months of exposure, the angle of contact with water and the difference in lightness (ΔL) between the test sample and an unexposed control were measured. The smaller the ΔL value is, the better the stain resistance is.

(5) Angle of Contact with Water in Polished Portion

The surface of the same test sample sheets (prepared by applying the clear coating of the invention onto a white top coating film, followed by baking) were polished with a #2400 sandpaper and further with a #4000 sandpaper. The sample sheets were exposed at the same site as above and, 6 months later, measured for angle of contact with water.

Examples 2 to 7 and Comparative Examples 1 to 3

Clear coatings were prepared by mixing up the resin components specified in Table 1 (the amounts being given on the solid basis). Then, clear coating films were formed in the same manner as mentioned above and the coating films obtained were evaluated in the same manner. The results obtained are shown in Table 1.

On the other hand, the clear coatings obtained in the comparative examples were inferior in coating film appearance and water resistance. Furthermore, they showed a larger angle of contact with water in polished portions after 6 months of exposure, and the coating film surface failed to show sufficient hydrophilicity and was inferior in stain resistance.

TABLE 1

|  | Example | | | | | Compar. Ex. | | |
| --- | --- | --- | --- | --- | --- | --- | --- | --- |
|  | 1 | 2 | 3 | 4 | 5 | 1 | 2 | 3 |
| Formulation |  |  |  |  |  |  |  |  |
| Silicate compound |  |  |  |  |  |  |  |  |
| A | 10 |  |  |  |  | 10 |  |  |
| B |  | 20 |  |  |  |  | 20 |  |
| C |  |  | 30 |  |  |  |  |  |
| Hydrolyzable silyl-containing resin |  |  |  |  |  |  |  |  |
| D | 5 |  |  |  |  |  |  |  |
| E |  | 20 | 30 |  |  |  |  |  |
| Silicate graft resin |  |  |  |  |  |  |  |  |
| F |  |  |  | 56 |  |  |  |  |
| G |  |  |  |  | 125 |  |  |  |
| Organic film-forming component |  |  |  |  |  |  |  |  |
| OH-containing acryl*1 | 49 | 42 | 37 | 29 |  | 49 | 42 | 52 |
| Polyisocyanate*2 | 46 | 38 | 33 | 35 | 21 | 46 | 38 | 48 |
| % Silicate relative to total resin components | 10 | 20 | 30 | 20 | 46 | 10 | 20 | 0 |
| % Hydrolyzable silyl-containing resin relative to total rein components | 5 | 20 | 30 | 0 | 0 | 0 | 0 | 0 |
| % Silicate-grafted resin relative to total resin components | 0 | 0 | 0 | 47 | 86 | 0 | 0 | 0 |
| Appearance |  |  |  |  |  |  |  |  |
| Coating film appearance |  |  |  |  |  |  |  |  |
| 90% humidity | ○ | ○ | ○ | ○ | ○ | Small cracks | Large cracks | ○ |
| 70% humidity | ○ | ○ | ○ | ○ | ○ | ○ | Small cracks | ○ |
| 50% humidity | ○ | ○ | ○ | ○ | ○ | Turbid | Turbid | ○ |
| Performance | ○ | ○ | ○ | ○ | ○ | X | X | ○ |
| Water resistance |  |  |  |  |  |  |  |  |
| Outdoor exposure |  |  |  |  |  |  |  |  |
| Initial |  |  |  |  |  |  |  |  |
| Angle of contact with water | 82 | 78 | 75 | 76 | 75 | 77 | 76 | 85 |
| 1 month |  |  |  |  |  |  |  |  |
| Stain resistance | −0.3 | −0.2 | −0.1 | −0.2 | −0.1 | −0.5 | −0.3 | −3.2 |
| Angle of contact with water | 39 | 31 | 31 | 33 | 34 | 37 | 35 | 83 |
| 6 months |  |  |  |  |  |  |  |  |
| Stain resistance | −0.4 | −0.2 | −0.3 | −0.4 | −0.5 | −0.8 | −0.5 | −15.6 |
| Angle of contact with water | 35 | 30 | 28 | 30 | 29 | 33 | 28 | 78 |
| Stain resistance of polished part | −1.8 | −1.0 | −0.9 | −0.9 | −0.8 | −12.5 | −10.1 | −14.6 |

*1: Mitsubishi Rayon's Dianal LR 2562 (OHV = 166, number average molecular weight = 4,000, novolatile matter = 61%)
*2: Mitsubishi Chemical's Mitec NY 215A (nonvolatile matter = 75%)

As is evident from Table 1, the clear coatings obtained in the examples can give coating films superior in appearance irrespective of humidity environment for application and can give coating films showing excellent stain resistance upon exposure. The cured coating films obtained with those compositions show a small angle of contact with water after one-month and 6-month exposure, the surface thereof in ordinary portions shows sufficient hydrophilicity and excellent stain resistance and, further, the surface thereof in polished portions is also superior in stain resistance.

What is claimed:
1. A top coating composition which comprises
   a coating film-forming resin (I);
   and a silicate-grafted resin (IV) resulting from graft polymerization of an organosilicate compound (II) onto a hydrolysable silyl-containing resin (III), wherein said organosilicate compound (II) is selected from the group consisting of methyl silicate or condensation product there of represented by the general formula (2),

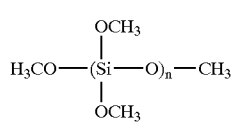

(2)

in the formula, n represents an integer of 1 to 30 and ethyl silicate or condensation product thereof represented by the general formula (3),

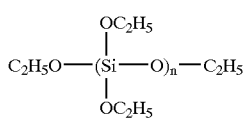

(3)

in the formula, n represents an integer of 1 to 30 and condensation product thereof.

2. A top coating composition which comprises a coating film-forming resin (I);
and a silicate-grated resin (IV) resulting from graft polymerization of a silicate compound (II) onto a hydrolysable silyl-containing resin (III);
wherein said silicate compound (II) is a modified silicate compound represented by the general formula (1):

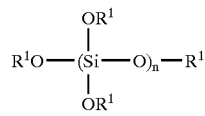

(1)

in the formula, n represents an integer of 1 to 30; at least one of the $R^1$ groups is an organic group represented by $R^2$—(O—$CH_2$—$CHR^3)_m$—, where $R^2$ is an alkyl group containing 1 to 8 carbon atoms, a phenyl group or a benzyl group, $R^3$ is a hydrogen atom or a methyl group and m is an integer of 1 to 4, and the remaining $R^1$ groups each is a methyl or ethyl group.

3. The top coating composition according to claim 1,
wherein said hydrolysable silyl-containing resin (III) is an acrylic resin obtained by radical polymerization of silanol- and/or hydrolysable silyl-containing, radical-polymerizable monomer (III-a), a hydroxyl-containing, radical-polymerizable monomer (III-b) and another radical-polymerizable monomer (III-c).

4. The top coating composition according to claim 1,
wherein said coating film-forming resin (I) comprises a hydroxyl-containing resin a polyisocyanate compound.

5. The top coating composition according to claim 2,
wherein said hydrolysable silyl-containing resin (III) is an acrylic resin obtained by radical polymerization of a silanol- and/or hydrolysable silyl-containing, radical-polymerizable monomer (III-a), a hydroxyl-containing, radical-polymerizable monomer (III-b) and another radical-polymerizable monomer (III-c).

6. The top coating composition according to claim 2,
wherein said coating film-forming resin (I) comprises a hydroxyl-containing resin and a polyisocyanate compound.

7. The top coating composition according to claim 3,
wherein said coating film-forming resin (I) comprises a hydroxyl-containing resin and a polyisocyanate compound.

* * * * *